Oct. 11, 1966   L. A. WOOLLEY   3,277,669
MOTOR DRIVE CONSTRUCTION
Filed April 26, 1963   2 Sheets-Sheet 1

INVENTOR.
Lee A. Woolley
BY
Hill, Sherman, Meroni, Gross & Simpson
ATTORNEYS

Oct. 11, 1966
L. A. WOOLLEY
3,277,669
MOTOR DRIVE CONSTRUCTION
Filed April 26, 1963
2 Sheets-Sheet 2
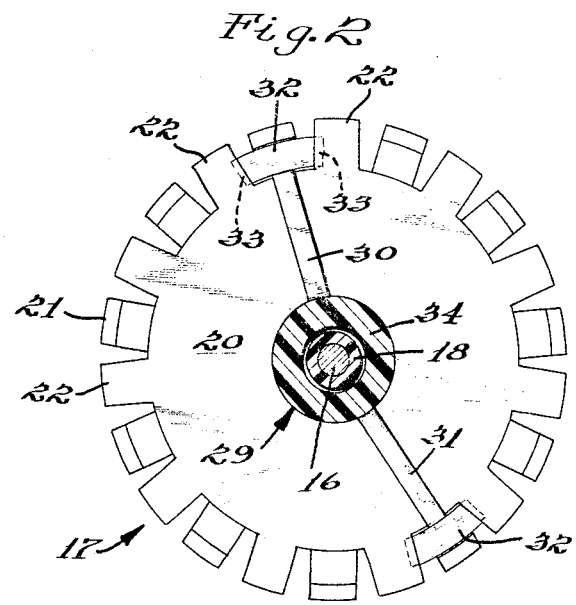
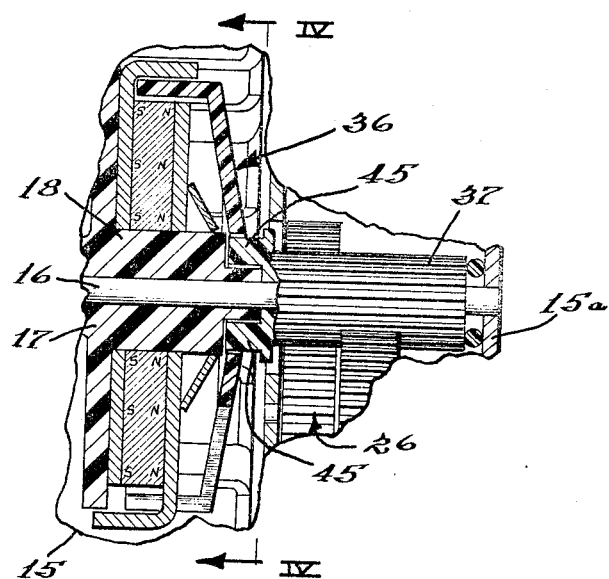
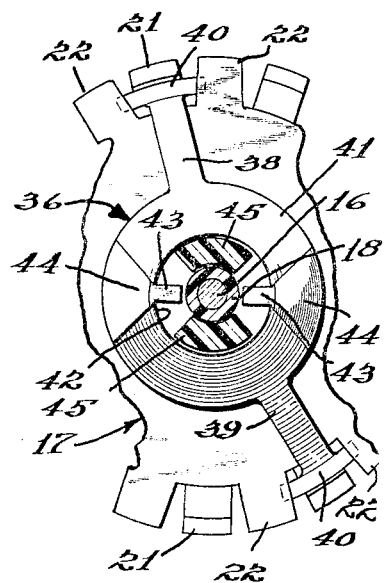
INVENTOR.
Lee A. Woolley
BY
Hill, Sherman, Meroni, Gross & Simpson
ATTORNEYS

United States Patent Office 3,277,669
Patented Oct. 11, 1966

3,277,669
MOTOR DRIVE CONSTRUCTION
Lee A. Woolley, Kokomo, Ind., assignor to Kingston Products Corporation, Kokomo, Ind., a corporation of Indiana
Filed Apr. 26, 1963, Ser. No. 276,029
2 Claims. (Cl. 64—27)

This invention relates generally to electric motors, and more specifically to an improved drive construction for a self-starting motor, such as of the synchronous type.

Although the principles of the present invention may be included in various devices, a particularly useful application is made in a synchronous motor of the clock type in which a self-starting permanently magnetic rotor is drivingly connected to a gear train incorporated within the structure of the device.

In motors of this general type, it has been noted that there has been a tendency for certain constructions to fail to start when electrically energized, such failure being attributable to the relative position of the parts when the motor is standing still, and to the point in the cycle which is present at the instant of energization.

The motor of this invention embodies a novel drive construction which avoids or precludes any starting failure.

Accordingly, it is an object of the present invention to provide an improved electric motor.

A further object of the present invention is to provide a motor having an improved drive construction connecting the rotor to the output element or pinion.

Yet, another object of the present invention is to provide a motor having an improved drive construction which is readily assemblable.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIGURE 2 is a cross-sectional view taken along line II—II of FIGURE 1, showing the rotor, and with stationary parts surrounding the same being omitted;

FIGURE 3 is a fragmentary enlarged cross-sectional view of a motor construction having a modified form of drive connection provided in accordance with the principles of the present invention;

FIGURE 4 is a fragmentary cross-sectional view taken along line IV—IV of FIGURE 3;

As shown on the drawings:

Figure 1:
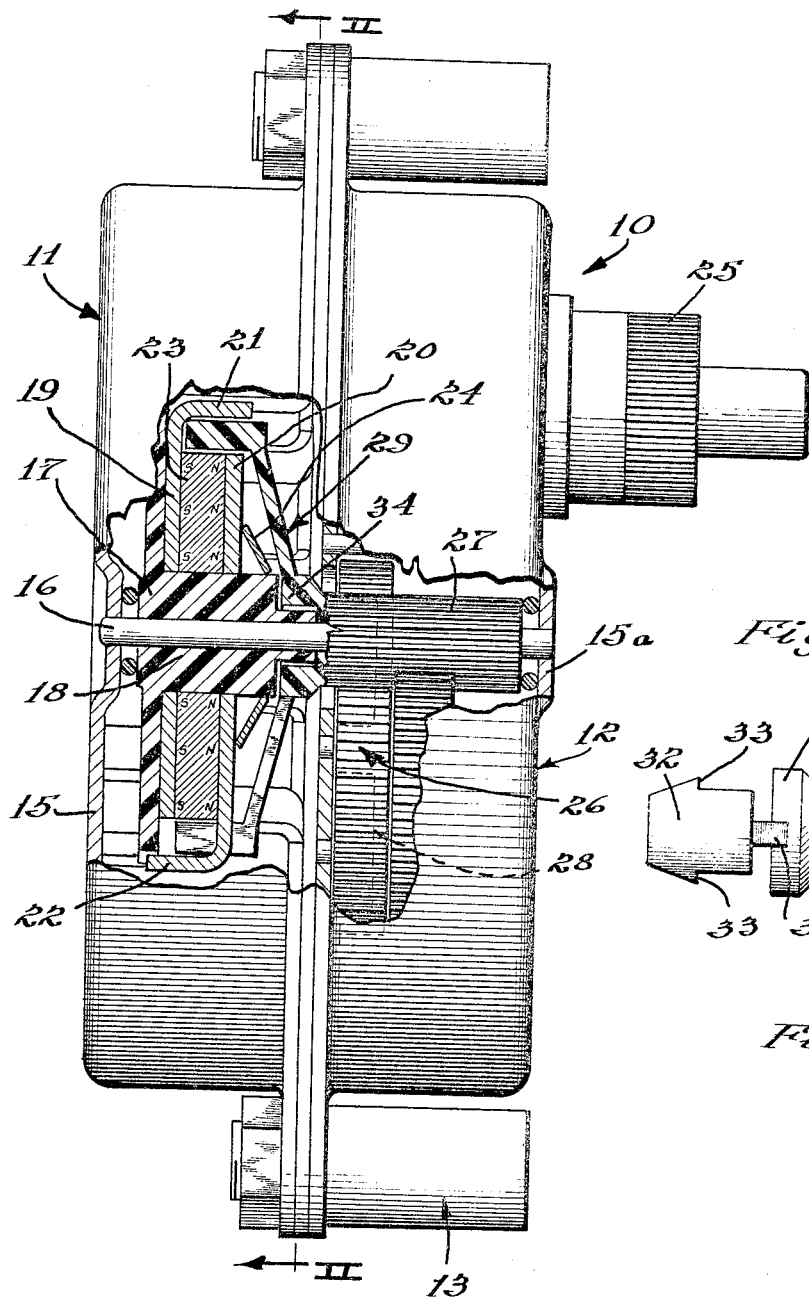
FIGURE 1 is an enlarged cross-sectional view of a motor construction provided with a drive mechanism in accordance with the principles of the present invention.

The principles of this invention are particularly useful when embodied in a unitized synchronous electric motor assembly such as illustrated in FIGURE 1, generally indicated by the numeral 10. The motor assembly 10 includes a motor section generally indicated at 11, a gear train section generally indicated at 12, and appropriate mounting means generally indicated at 13. The motor assembly 10 is enclosed by a pair of case sections 15, 15a which jointly support a concentric stationary elongated pin 16 which is pressed or staked to the case section 15. The motor section 11 includes a rotor assembly 17 which is freely rotatably supported on the pin 16. The support for the rotor 17 is provided by a hub 18 which directly engages the elongated pin 16, and which supports a pair of pole plates 19, 20, respectively having poles 21, 22 interfitted between each other and angularly spaced from each other as best seen in FIGURE 2. Between the pole plates 19 and 20, there is an annular axially magnetized permanent magnet 23. The pole plates 19, 20 and the magnet 23 are held in fixed position with respect to each other on the hub 18 by a spring 24.

The gear train section 12 includes an output gear or pinion 25 driven by a gear train generally indicated at 26, the first gear of which is driven by a rotor pinion 27. With the first gear of the gear train 26, there is provided a no-back or reversing mechanism schematically indicated at 28 for insuring that the output pinion 25 runs only in the correct predetermined direction. The no-back mechanism 28, in response to a wrong-direction start of the rotor 17, acts through the pinion 27 to reverse the direction of rotor rotation.

The pinion 27, like the rotor 17, is mounted for free rotation on the elongated stationary pin 16, whereby the rotor 17 and the pinion 27 are concentric and have a common rotational axis. However, there is no drive connection of any kind between the rotor hub 17 and the rotor pinion 27.

In this embodiment, the rotor pinion 27 forms a part of a torque transmitting member generally indicated at 29 which comprises molded resilient plastic, such as polyurethane.

Figure 5:
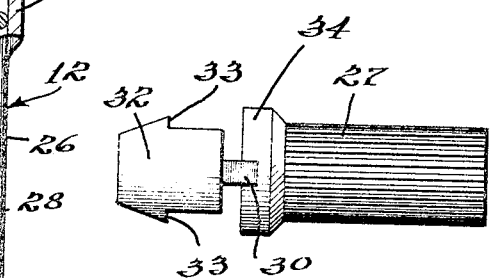
FIGURE 5 is an elevational view of a torque transmitting member, varying slightly in configuration from that shown in FIGURE 1.

As best seen in FIGURE 2, the torque transmitting member 29 includes a pair of resilient arms 30, 31 each having an outer end which is fixedly secured in the gap between a pair of adjacent poles 22 of like polarity. The outer end of each of the arms 30 and 31 has a wedge structure 32, best seen in FIGURE 5, which defines a pair of shoulders 33, 33 respectively received beneath adjacent rotor poles 22, 22. Each of the resilient arms 30, 31 extends generally radially inwardly, where they merge with an annular driving means 34 which in this embodiment is integral with such resilient arms 30, 31 and is also integral with the inner end of the pinion 27.

In the embodiment shown in FIGURE 2, the pole plate 20 has an odd number of poles. Where this number is even, the arms 30, 31 may be diametrically aligned with each other, a variation illustrated in FIGURE 5.

When the motor stator is energized, the rotor 17 begins to turn in either direction. Owing to the load placed on the driving means 34 by the gear train 26, the rotor turns slightly against the resilient yielding of the arms 30, 31, tending to deflect them slightly into a spiral configuration. The initial yielding will be slightly greater than that which would be expected during normal operation, and is greatest when the no-back mechanism arrests movement of the pinion portion 27 and hence also movement of the driving portion 34, thereby storing further energy in the arms 30, 31 to reinitiate rotor rotation, but in the opposite direction.

Figure 6:
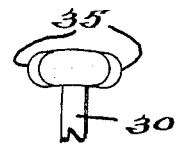
FIGURE 6 is a fragmentary elevational view illustrating a further variation which may be applied to the structure of FIGURE 5.

If desired, the resilient wedge portions or structure 32 may have rounded circumferentially directed ends and shoulders as indicated at 35 in FIGURE 6.

In the embodiment of FIGURE 1 there is no free angular lost motion between the rotor 17 and the pinion 27, but this structure enables only the resiliently opposed relative movement therebetween which has been described above.

In the embodiment shown in FIGURES 3 and 4 there is provided a modified form of torque transmitting member generally indicated at 36 which further enables a certain amount of free angular lost motion between the rotor 17 and a corresponding rotor pinion 37. The torque transmitting member 36 includes a pair of generally oppositely directed arms 38, 39, each having an outer end to which there is attached a wedge structure 40, identical to the wedge structure 32. The arms 38, 39 extend generally radially inward, and integrally merge with or join in a driving means or portion 41 of annular configuration which has no driving connection with the hub 18 of the rotor 17. The driving means 41 is supported solely by the resilient arms 38, 39. The annular driving means 41 has a central opening 42 into which there projects a pair of driving dogs 43, 43 integral with the driving means 41, the radially outer ends of the driving dogs 43 being thickened as shown at 44 to stiffen the same. Although the rotor pinion 37, like the pinion 27 is supported for free rotation on the elongated pin 16, it has no integral connection with the torque transmitting member 36. In place thereof, and to coact with the driving dogs 43, the pinion 37 has a pair of ears 45 directed in a direction parallel to the rotational axis and radially offset therefrom. The ears 45 are received between the driving dogs 43 as shown in FIGURE 4, and are angularly spaced from each other to receive the driving dogs 43 therebetween with clearance. The clearance thus provided enables the driving dogs or means 43 to be angularly driven through the remaining clearance before engaging the ears 45.

The torque transmitting member 36, like the torque transmitting member 29, comprises molded resilient polyurethane. Thus, the rotor 17 and the pinion 37 are provided with both an angular lost motion rotational driving connection therebetween and with a resiliently opposed driving connection therebetween.

The operation of the embodiment of FIGURES 3 and 4 is otherwise the same as that of FIGURES 1 and 2.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a self-starting alternating current motor, the improvement comprising:
   (a) a rotor having angularly spaced magnetic poles supported for free rotation about an axis in response to a magnetic field;
   (b) a torque transmitting member including resilient arm means having a resilient non-magnetic wedge structure fixedly secured at one end in the space between a pair of said rotor poles, said arm means extending generally radially inwardly and having driving means at the other end powered through said arm for rotatably driving a load; and
   (c) a pinion having an angular lost motion drive connection with said driving means.

2. In a self-starting alternating current motor, the improvement comprising:
   (a) a rotor having angularly spaced magnetic poles supported for free rotation about an axis in response to a magnetic field;
   (b) a torque transmitting member including resilient arm means having a resilient non-magnetic wedge structure at one end directed in an axial direction and disposed in a space between a pair of said rotor poles, said arm means extending generally radially inwardly and having driving means at the other end powered through said arm for rotatably driving a load; and
   (c) means on said wedge structure locking said wedge structure in said space.

References Cited by the Examiner
UNITED STATES PATENTS

| | | | |
|---|---|---|---|
| 1,756,689 | 4/1930 | Jenkins | 64—27 |
| 2,788,455 | 4/1957 | Kohlhagen | 310—41 |
| 2,883,840 | 4/1959 | Geiger | 64—27 |
| 3,013,413 | 12/1961 | Luning | 64—27 |
| 3,103,800 | 9/1963 | Kantar | 64—27 |

FRED C. MATTERN, JR., *Primary Examiner.*

HALL C. COE, *Examiner.*